US011875959B2

(12) United States Patent
Meissner et al.

(10) Patent No.: US 11,875,959 B2
(45) Date of Patent: Jan. 16, 2024

(54) SWITCHING DEVICE FOR FAST DISCONNECTION OF SHORT-CIRCUIT CURRENTS

(71) Applicant: Eaton Intelligent Power Limited, Dublin (IE)

(72) Inventors: Johannes Meissner, Bonn (DE); Julia Otte, Cologne (DE); Kai Schroeder, Niederkassel (DE); Madeline Dumont, Eitorf (DE)

(73) Assignee: EATON INTELLIGENT POWER LIMITED, Dublin (IE)

(*) Notice: Subject to any disclaimer, the term of this patent is extended or adjusted under 35 U.S.C. 154(b) by 52 days.

(21) Appl. No.: 17/440,824

(22) PCT Filed: Mar. 12, 2020

(86) PCT No.: PCT/EP2020/056663
§ 371 (c)(1),
(2) Date: Sep. 20, 2021

(87) PCT Pub. No.: WO2020/187688
PCT Pub. Date: Sep. 24, 2020

(65) Prior Publication Data

US 2022/0181108 A1 Jun. 9, 2022

(30) Foreign Application Priority Data

Mar. 18, 2019 (GB) ..................................... 1903662

(51) Int. Cl.
*H01H 9/30* (2006.01)
*H01H 33/22* (2006.01)
(Continued)

(52) U.S. Cl.
CPC .............. *H01H 39/00* (2013.01); *H01H 9/30* (2013.01); *H01H 33/22* (2013.01); *H01H 33/38* (2013.01); *H01H 33/91* (2013.01)

(58) Field of Classification Search
CPC .......... H01H 9/30; H01H 33/22; H01H 33/38; H01H 33/91; H01H 33/904; H01H 39/00;
(Continued)

(56) References Cited

U.S. PATENT DOCUMENTS 4,224,491 A * 9/1980 Kroon .................... H01H 39/00 337/401
4,490,707 A * 12/1984 O'Leary .............. H01H 39/006 337/6

(Continued)

FOREIGN PATENT DOCUMENTS

CN 1309812 A 8/2001
CN 102005328 A 4/2011

(Continued)

OTHER PUBLICATIONS

Joerg Teichmann, Magnetically Driven High Current Switching Arcs in Vacuum and Low Pressure Gas, IEEE Trasactions on Plasma Science, vol. 27, No. 4, Aug. 1999.

(Continued)

*Primary Examiner* — William A Bolton
(74) *Attorney, Agent, or Firm* — LEYDIG, VOIT & MAYER, LTD.

(57) ABSTRACT

A switching device for fast disconnection of short-circuit currents includes a switching bridge with a movable contacting element and a fixed contacting element. The switching bridge is operable in a closed state, in which the movable contacting element is in contact with the fixed contacting element, and an open state, in which the movable contacting element is spaced apart from the fixed contacting element.
(Continued)

The switching device further includes an electromagnetic switching drive with a coil for generating a magnetic field and a magnet anchor, a guide sleeve to guide the movement of the magnet anchor in the magnetic field of the coil, a pyrotechnic propellant charge located in the cavity, and a supporting device for supporting the guide sleeve. The magnet anchor is arranged within the guide sleeve such that a cavity is formed below the magnet anchor.

15 Claims, 6 Drawing Sheets

(51) Int. Cl.
*H01H 33/38* (2006.01)
*H01H 33/91* (2006.01)
*H01H 39/00* (2006.01)

(58) Field of Classification Search
CPC .. H01H 39/002; H01H 2039/008; H01H 1/20; H01H 50/546; H01H 89/00
USPC ................................ 200/61; 218/92, 95, 111
See application file for complete search history.

(56) References Cited

U.S. PATENT DOCUMENTS

| | | | | |
|---|---|---|---|---|
| 5,825,269 | A | 10/1998 | Koppmann | |
| 6,252,190 | B1 | 6/2001 | Niemeyer | |
| 6,262,648 | B1 | 7/2001 | Lammers et al. | |
| 6,634,299 | B2 * | 10/2003 | Vetter | F42B 3/26 280/743.1 |
| 8,549,975 | B2 * | 10/2013 | Schafer | B60R 21/38 180/274 |
| 9,324,522 | B2 * | 4/2016 | Nakamura | H01H 39/006 |
| 9,418,807 | B2 * | 8/2016 | Marlin | H01H 1/365 |
| 9,646,788 | B2 * | 5/2017 | Parks | H01H 39/004 |
| 2007/0102269 | A1 * | 5/2007 | Hartmann | H01H 71/14 200/81 R |
| 2010/0097166 | A1 | 4/2010 | Hasel et al. | |
| 2014/0347151 | A1 | 11/2014 | Gerving et al. | |
| 2015/0248979 | A1 | 9/2015 | Parks et al. | |
| 2017/0309432 | A1 * | 10/2017 | Lell | H01H 39/006 |
| 2018/0047533 | A1 * | 2/2018 | Kim | H01H 39/00 |
| 2018/0144890 | A1 | 5/2018 | Boettcher et al. | |
| 2018/0350540 | A1 | 12/2018 | Sullivan et al. | |

FOREIGN PATENT DOCUMENTS

| | | | |
|---|---|---|---|
| CN | 105280431 | A | 1/2016 |
| CN | 107743648 | A | 2/2018 |
| CN | 109036957 | A | 12/2018 |
| CN | 109273314 | A | 1/2019 |
| DE | 4341330 | C1 | 4/1995 |
| DE | 19900666 | A | 7/2000 |
| DE | 102008051900 | A1 | 4/2010 |
| DE | 102012212509 | A1 | 1/2014 |
| DE | 102018103018 | A1 | 3/2018 |
| EP | 0450104 | A1 | 10/1991 |
| FR | 2741994 | A1 | 6/1997 |
| FR | 2844915 | A1 | 3/2004 |
| GB | 405388 | A | 2/1934 |
| GB | 201900045 | | 9/2019 |
| WO | WO 9741582 | A1 | 11/1997 |
| WO | WO 2010061576 | A1 | 6/2010 |
| WO | WO 2012011119 | A1 | 1/2012 |
| WO | WO 2013139870 | A1 | 9/2013 |

OTHER PUBLICATIONS

Li Yong-Ming, Simulation of an automobile ignition system electro magnetic interference, (State Key Laboratory of Power Transmission Equipment, System Security and New Technology, Chongqing University, Chongqing 400030, P.R. China.

* cited by examiner

SWITCHING DEVICE FOR FAST DISCONNECTION OF SHORT-CIRCUIT CURRENTS

CROSS-REFERENCE TO PRIOR APPLICATIONS

This application is a U.S. National Phase application under 35 U.S.C. § 371 of International Application No. PCT/EP2020/056663, filed on Mar. 12, 2020, and claims benefit to British Patent Application No. GB 1903662.3, filed on Mar. 18, 2019. The International Application was published in English on Sep. 24, 2020 as WO 2020/187688 under PCT Article 21(2).

FIELD

The disclosure relates to a switching device for fast disconnection of short-circuit currents, for example high direct current (DC) currents, mainly for applications in the field of electromobility.

BACKGROUND

In order to conduct and switch high DC currents, especially in so-called high-voltage on-board supply systems of electric vehicles, a polarity-independent DC compact switching device may be used. For the realization of a high number of switching operations, the switching device is based on the principle of a contactor comprising a switching bridge/component equipped with at least two contact pairs that enable the opening and closing of switching contacts of the switching bridge via an electromagnetic switching drive/actuator.

For switching DC currents in rated operation, the switching circuit comprises a permanent magnetic arc driver arrangement which drives the arcs formed when the contacts are opened in the direction of deionization arc extinguishing chambers where they are quickly extinguished by dividing them into individual partial arcs and cooling.

In order to control overcurrents and short-circuit currents in the kilo amp range, such as those which can occur in a crash, the current routing in the switching device is designed in such a way that, in such a case, dynamic magnetic blast field forces are generated which superimpose the permanent magnetic field and, after opening the switching contacts, ensure rapid movement of the arcs in the direction of the arc extinguishing chambers and subsequent extinction.

A monitoring sensor, preferably in the form of a Hall sensor, which initiates a switch-off signal in the control electronics of the switching device when the current in the switching device increases above a current limit value, ensures an early opening of the contacts in the switching device, which in turn ensures rapid de-energization of a solenoid drive coil of the electromagnetic switching drive and thus rapid opening of the contacts.

For a control of high short-circuit currents by the switching device, it is of elementary importance that the timespan from the occurrence of a short-circuit to the extinction of the associated arcs is as short as possible in order to limit the energy of the arcs to a minimum. For safety in an electric vehicle after a short-circuit has occurred, it is also important the high-voltage on-board power supply system cannot be switched on again at least until the cause of the short-circuit has been found and eliminated.

WO 2010/061576 A1 is directed to a switching device comprising a switching bridge with a movable contact. The switching device comprises an electromagnetic switching mechanism 25 and a gas actuating mechanism 32 to move the switching bridge. CN 109036957 A is directed to a permanent magnet explosive hybrid contactor comprising an explosive structure and an electromagnetic part to move a movable contact to complete a contactor closing action. DE 4341330 C1 is directed to an electromagnetic switching device comprising an arresting means to lock a switching bridge.

There is a desire to provide a switching device for a fast disconnection of short-circuit currents so that any damage caused by the high energy of arcs generated between contacts of the switching device can be prevented.

SUMMARY

In an embodiment, the present invention provides a switching device for fast disconnection of short-circuit currents, comprising: a switching bridge with a movable contacting element and a fixed contacting element, the switching bridge being operable in a closed state, in which the movable contacting element is in contact with the fixed contacting element, and an open state, in which the movable contacting element is spaced apart from the fixed contacting element, an electromagnetic switching drive with a coil for generating a magnetic field and a magnet anchor, wherein a movement of the magnet anchor is coupled to a movement of the switching bridge, a guide sleeve to guide the movement of the magnet anchor in the magnetic field of the coil, the magnet anchor being arranged within the guide sleeve such that a cavity is formed below the magnet anchor, a pyrotechnic propellant charge located in the cavity, a supporting device for supporting the guide sleeve, wherein the guide sleeve and the magnet anchor and the pyrotechnic propellant charge interact such that, as a result of ignition of the pyrotechnic propellant charge within the cavity, the magnet anchor is moved from a first position within the guide sleeve at which the switching bridge is operated in the closed state to a second position within the guide sleeve at which the switching bridge is operated in the open state, wherein the supporting device and the guide sleeve are arranged such that a gap is formed between the guide sleeve and the supporting device, wherein the gap is configured to guide a gas flow of gases produced during ignition of the pyrotechnic propellant charge and emerging from the cavity into the gap.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
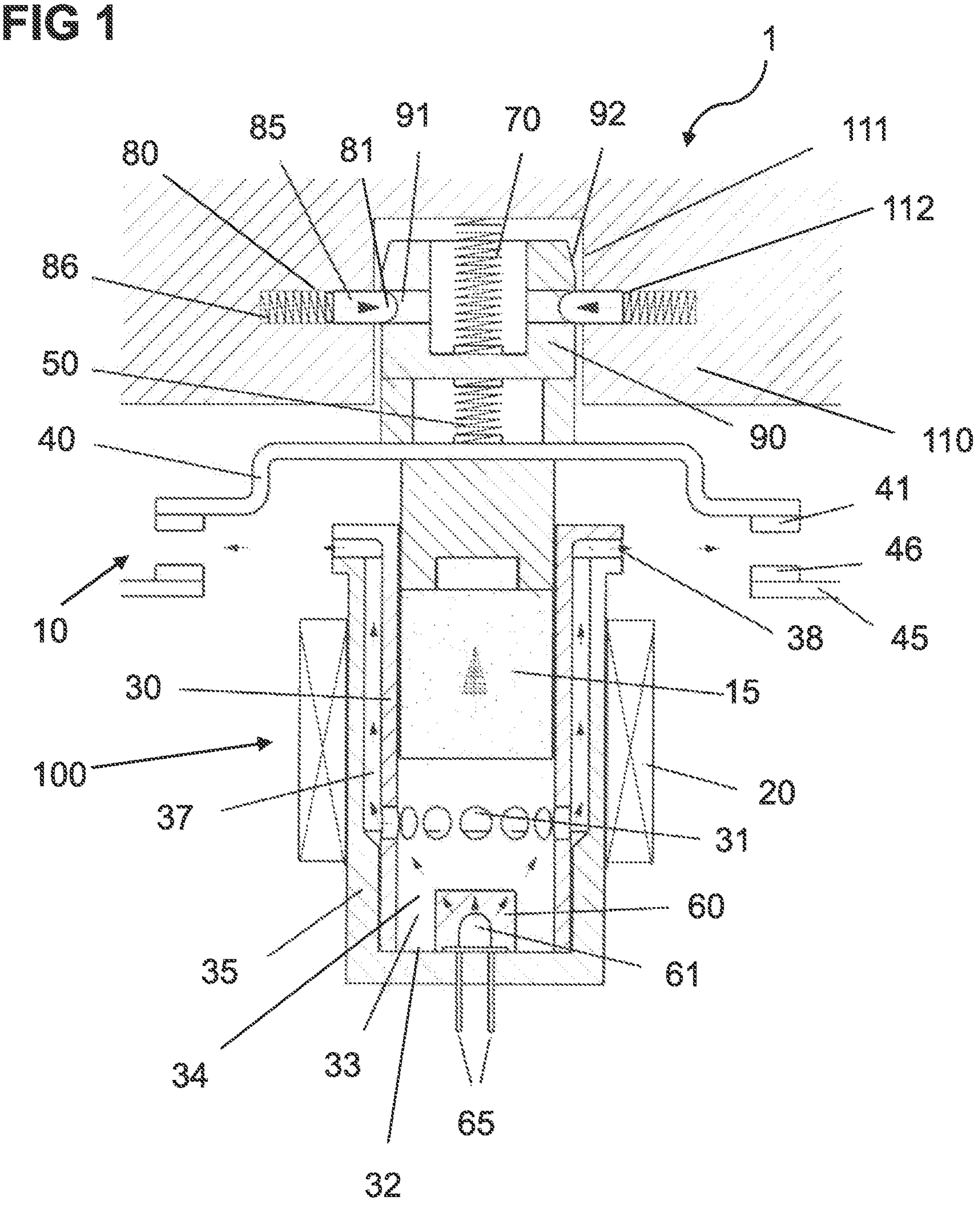
FIG. 1 shows an embodiment of a switching device for fast disconnection of short-circuit currents.

An embodiment of a switching device for fast disconnection of short-circuit currents is described herein.

According to an embodiment, the switching device comprises a switching bridge with a movable contacting element and a fixed contacting element. The switching bridge is operable in a closed state, in which the movable contacting element is in contact with the fixed contacting element, and an open state, in which the movable contacting element is spaced apart from the fixed contacting element. The switching device further comprises an electromagnetic switching drive with a coil for generating a magnetic field and a magnet anchor, wherein a movement of the magnet anchor is coupled to a movement of the switching bridge.

The switching device further comprises a guide sleeve to guide the movement of the magnet anchor in the magnetic field of the coil. The magnet anchor is arranged within the guide sleeve such that a cavity is formed below the magnet anchor.

The switching device comprises a pyrotechnic propellant charge located in the cavity. The guide sleeve and the magnet anchor and the pyrotechnic propellant charge interact such that, as a result of ignition of the pyrotechnic propellant charge within the cavity, the magnet anchor is moved from a first position within the guide sleeve at which the switching bridge is operated in the closed state to a second position within the guide sleeve at which the switching bridge is operated in the open state.

The switching device which is based on a pyrotechnical active principle enables a fast switching-off of short-circuit currents. Furthermore, the switching device may be advantageously configured such that a fast extinction of arcs generated between the movable contacting element and the fixed contacting element is enabled so that the timespan from the occurrence of a short-circuit until the extinction of the arcs between the contacting elements is as short as possible. For this purpose, a gas jet produced by the ignition of the pyrotechnic propellant charge may be guided in a space between the opened movable and fixed contacting elements where the arcs are generated in the open state of the switching bridge.

According to another advantageous embodiment, the switching device comprises an arresting device for locking the movable contacting element of the switching bridge. The arresting functionality of the switching device may be realized in a mechanical or electromechanical way. The arresting device for locking the movable contacting element in the open state of the switching bridge allows to prevent the switching bridge from being moved again unintentionally from the open state in the closed state after a previous short-circuit event. Additional features and advantages are set forth in the detailed description that follows and in part will be readily apparent to those skilled in the art from the description or recognized by practicing the embodiments as described in the written description and claims hereof, as well as the appended drawings. It is to be understood that both the foregoing general description and the following detailed description are merely exemplary, and are intended to provide an overview or framework for understanding the nature and character of the present disclosure.

FIG. 1 shows an embodiment of a switching device 1 for fast disconnection of short-circuit currents comprising a switching bridge/component 10 with a movable contacting element 40 and a fixed contacting element 45. The switching device 1 further comprises an electromagnetic switching drive/actuator 100 with a coil 20 for generating a magnetic field and a magnet anchor 15 at the end facing the drive coil 20. The magnetic anchor 15 is made of a ferritic material and may preferably have a cylindrical shape. The magnet anchor 15 is coupled to the switching bridge 10 such that a movement of the magnet anchor 15 is coupled to a movement of the switching bridge 10. The switching bridge 10 is operable in a closed state, in which the movable contacting element 40 is in contact with the fixed contacting element 45. The switching bridge 10 is further operable in an open state, in which the movable contacting element 40 is spaced apart from the fixed contacting element 45.

The switching device 1 comprises a guide sleeve 30 to guide the movement of the magnet anchor 15 in the magnetic field of the coil 20. The guide sleeve 30 is preferably made of a temperature-resistant metallic material. In order to enable a sliding movement of the magnet anchor 15 within the guide sleeve 30, there is only a small clearance between the outer diameter of the magnet anchor 15 and the wall of the guide sleeve 30.

The switching bridge 10 and the electromagnetic switching drive 100 cooperate such that when the magnet anchor 15 is moved to a first position within the guide sleeve 30, the switching bridge 10 is operated in the closed state and, when the magnet anchor 15 is moved to a second position within the guide sleeve 30, the switching bridge 10 is operated in the open state.

As shown in FIG. 1, the magnet anchor 15 is arranged within the guide sleeve 30 such that a cavity 33 is formed below the magnet anchor 15. A pyrotechnic propellant charge 60 is located in the cavity 33. The pyrotechnic propellant charge 60 may comprise a one-component ignitable mixture or an initial ignitor, for example in the form of a primer 61, with a propellant charge surrounding it. In both cases, the ignition takes place electrically via two ignition electrodes 65 shown in FIG. 1.

The guide sleeve 30 and the magnetic anchor 15 and the pyrotechnic propellant charge 60 interact such that, as a result of the ignition of the pyrotechnic propellant charge 60 within the cavity 33, the magnetic anchor 15 is moved from a position within the guide sleeve 30 at which the switching bridge 10 is operated in the closed state to the second position within the guide sleeve 30 at which the switching bridge 10 is operated in the open state.

The switching device 1 comprises a supporting device 35 for supporting the guide sleeve 30. As shown in FIG. 1, the cavity 33 is formed between a bottom side of the magnetic anchor 15 and a bottom surface 32 of the supporting device 35. The pyrotechnic propellant charge 60 is preferably arranged at the bottom surface of the supporting device 35 in the cavity/empty volume 33 inside the guide sleeve 30 which, in the switched-on case of the switching bridge 10 in which the (dipping) magnetic anchor 15 is located in the center of the coil 20, remains below the magnetic anchor 15.

The supporting device 35 and the guide sleeve 30 are arranged such that a gap 32 is formed between the guide sleeve 30 and the supporting device 35. According to an embodiment of the switching device 1, the guide sleeve 30 has at least one opening 31 through which gases produced during ignition of the pyrotechnic propellant charge 60 emerge from the cavity 33 into the gap 37. The at least one opening 31 may be formed as an annular hole arrangement in a wall 34 of the guide sleeve 30.

As shown in FIG. 1, the guide sleeve 30 is itself embedded in the likewise fixedly arranged cup-shaped supporting device 35 that tightly surrounds the guide sleeve 30 below the at least one opening 31 located in the circumference of the guide sleeve 30. As further shown in FIG. 1, starting from the at least one opening arrangement 31, the supporting device 35 has a slightly enlarged diameter, whereby the (annular) gap 37 is formed in this region between the guide sleeve 30 and the supporting device 35.

According to the embodiment of the switching device 1 shown in FIG. 1, the movable contacting element 40 and the fixed contacting element 45 each comprise a contact member 41 and 46 for electrically contacting the movable contacting element 40 with the fixed contacting element 45. The gap 37 has an outlet opening 38 for the outflow of the gases from the cavity 33. As illustrated in FIG. 1, at the level of the contact members 41, 46, the gap 37 has two diametrically opposed outlet openings 38 aligned with the two contact members 41, 46. The supporting device 35 and the guide sleeve 30 are shaped such that the gases emerging from the outlet opening 38 of the gap 37 flow into a space between the contact member 41 of the movable contacting element 40 and the contact member 46 of the fixed contacting element 45, when the pyrotechnic propellant charge 60 is ignited.

During a switching operation of the switching bridge 10, the magnetic anchor 15 moves within the fixed guide sleeve 30. When the drive coil 20 is energized during the switch-on operation state of the switching bridge 10, the magnetic anchor 15 is pulled into the center of the coil 20. At the same time an electrical contact is made between the contact member 41 at the ends of the movable contacting element 40 and the fixed contact members 46. A contact pressure spring 50 ensures the required contact pressure in the closed state of the switching bridge 10. The movable contacting element 40 can essentially be of linear geometry or have a modified form for the creation of a dynamic magnetic blowout field for overcurrent and short-circuit cases.

If a short-circuit occurs in the high-voltage supply system of a vehicle which may be detected, for example, by Hall sensors, switch electronics of the vehicle electronics may provide an ignition signal to the ignition electrodes 65 so that the pyrotechnic propellant charge 60 ignites within a few microseconds. The pyrotechnic propellant charge 60 can also be ignited as a safety measure in the event of a crash of the vehicle in order to prevent a possible short-circuit in the high-voltage supply system of the vehicle induced by the crash. In this case, the ignition signal is preferably triggered by the vehicle's airbag electronics. At the same as the ignition signal, the control electronics of the electromagnetic switching drive 100 also receive a signal for immediate disconnection and fast de-energization of the drive coil 20.

Immediately after activation, the pyrotechnic substance 60 builds up a high gas pressure in the cavity 33 below the magnetic anchor 15, giving the cavity 33 the character of a reaction chamber. The gas pressure generates a strong force on the magnetic anchor 15 in such a way that the magnetic anchor 15 sets itself in motion directly in the direction of the movable contacting element 40 and thus initiates a very fast contact opening. Furthermore, a gas flow is simultaneously generated in the cavity 33, which is first pressed through the at least one opening 31, for example an annular hole arrangement 31, into the (annular) gap 37 between the guide sleeve 30 and the supporting device 35 and further through the outlet opening 38 in an area between the opened contact members 41 and 46.

The gas stream emerging in the form of pulses acts directly on the area between the contact members 41 and 46 in such a way that the arcs formed between the spaced-apart contact members 41, 46 undergo strong cooling and deionization immediately after their formation so that the arcs may extinguish even before they are driven into the extinguishing chambers under the effect of the magnetic blast field forces. In order to enable a fast extinguishing effect, an optimal coordination between type and quantity of the material of the pyrotechnic propellant charge 60, on the one hand, and the dimensioning of the at least one opening/hole arrangement 31 and the gap 37 and cross-section of the outlet opening 38, on the other hand, is necessary.

Figure 2:
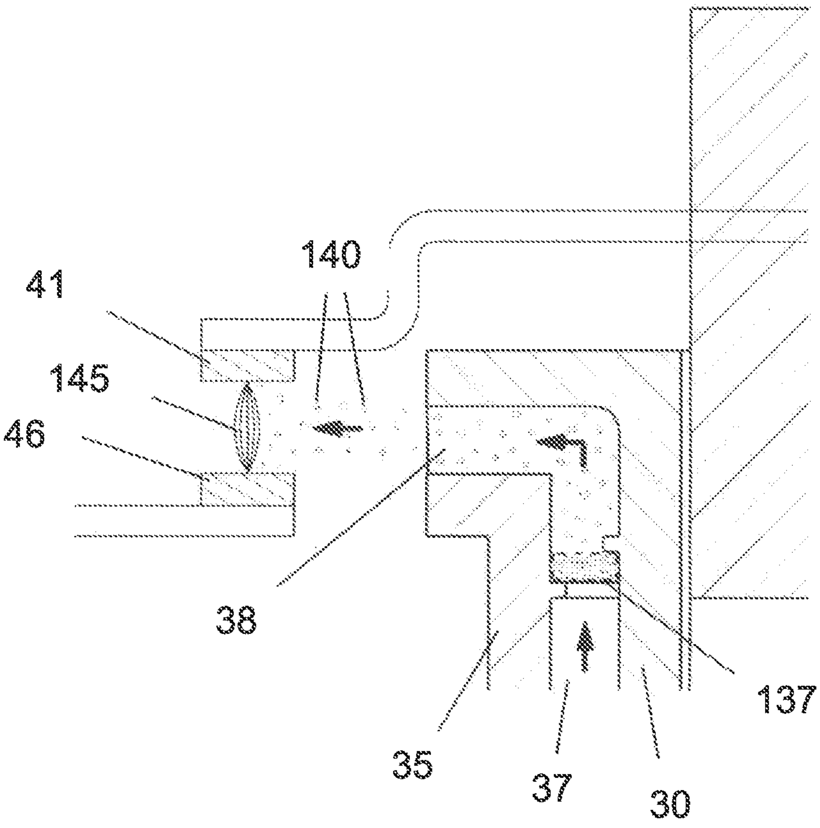
FIG. 2 illustrates an enlarged portion of a switching device for fast disconnection of short-circuit currents with an absorber element to absorb an extinguishing agent for extinguishing an electric arc.

A particularly efficient arc extinction, based on using a pyrotechnic propellant charge in the switching device 1, can be achieved by introducing an extinguishing agent into the reaction chamber, i.e. the cavity 33 or the gap 37. An exemplified embodiment of a portion of a switching device being provided with an extinguishing agent in the gap 37 is shown in FIG. 2. According to the embodiment of the switching device 1 shown in FIG. 2, the switching device 1 comprises a gas-permeable absorber element 137 being arranged in the gap 37. The gas-permeable absorber element 137 comprises a material adapted to absorb an extinguishing agent for extinguishing an electric arc generated between the contact members 41, 46. According to an advantageous embodiment of the switching device 1, the gas-permeable absorber element 137 is formed as a mineral fiber pad/cushion.

According to an advantageous embodiment, an evaporable liquid extinguishing agent may be used as an aid for a fast extinction of the arcs generated between the opened contact members 41 and 46. A silicone oil may be used as an evaporable liquid extinguishing agent. If the extinguishing agent comes into contact with the electric arc, the extinguishing agent changes completely or at least partially into a gaseous state, whereby energy is extracted from the arc. Furthermore, the electrically insulating character of the evaporated extinguishing agent increases the electrical resistance of the arc.

According to the exemplary embodiment of the switching device 1 shown in FIG. 2, a porous, gas-permeable carrier material is used for the absorber element 137. The absorber element 137 may be configured as a mineral fiber pad/cushion which, comparable to a water-soaked sponge, is impregnated with silicone oil and is located in the gap 37 in such a way that the carrier material of the absorber element 137 impregnated with an extinguishing agent surrounds the guide sleeve 30 in an annular manner just below the height of the outlet openings 38. The absorber element 137 may be embodied as a carrier ring made of gas-permeable carrier material.

When the gas jet produced by ignition of the pyrotechnic propellant charge 60 hits the absorber element 137, the extinguishing agent, for example the silicone oil, stored therein is atomized into fine droplets 140 and blown through the outlet openings 38 into the arcs 145 formed when the contact members 41, 46 are opened. The nebulized extinguishing agent, for example, the silicone oil, is vaporized to a large extent under the effect of contact with the electric arc. At the same time, the electrical resistance of the arc is increased by the insulating effect of the evaporated extinguishing agent. The associated loss of energy and the increase in resistance result in a rapid increase in the arc voltage, which usually causes an early extinguishing of the arc.

In the case of a regular switch-off of the switching bridge 10 triggered by the electromagnetic switching drive 100, the contact opening way of the switching bridge 10 would be limited by a limiting spring 70 being arranged in the bridge receptacle 110 and connected to the movable contacting element 40. The spring 70 counteracts the restoring force of the switched-off switching bridge 10. The point of maximum contact opening is determined by the equilibrium of the two opposing forces. In the event of a short-circuit or accidental shutdown, the high force generated by ignition of the pyrotechnic propellant charge on the magnetic anchor 15 dominants the movement sequence of the movable contacting element 40. This force causes a further movement of the movable contacting element 40 beyond the point of the maximum contact opening and a compression of the limiting spring 70.

According to an advantageous embodiment of the switching device 1, the switching device comprises an arresting device 80 for locking the movable contacting element 40. The arresting device 80 is arranged such that the arresting device 80 arrests the movable contacting element 40 in the open state when the switching bridge 10 has been moved into the open state as a result of the ignition of the pyrotechnic propellant charge 60.

The switching device comprises a switching bridge head 90 connected to the movable contacting element 40. The switching device 1 further comprises a bridge receptacle 110 for receiving the switching bridge head 90 and for guiding the switching bridge head 90 during the movement of the movable contacting element 40.

According to a possible embodiment, the arresting device 80 may be arranged in a bore 112 in a wall 111 of the bridge receptacle 110.

According to the embodiment of the switching device 1 shown in FIG. 1, the arresting device 80 comprises an arresting pin 85 and a spring 86. The switching bridge head 90 has a recess 91. The arresting device 80 is embodied such that the spring 86 exerts a force on the arresting pin 85 so that a head 81 of the arresting pin 85 slides along a surface of the switching bridge head 90 and engages in the recess 91 of the switching bridge head 90, when the switching bridge 10 is moved from the closed state to the open state as a result of ignition of the pyrotechnic propellant charge 60.

The arresting point of the movable contacting element 40 of the switching bridge 10 is reached only when the arresting pins 85 mounted laterally in the bridge receptacle 110, after passing through a conically shaped end portion 92 of the switching bridge head 90, are biased via the arresting springs 86 to then enter a circumferential groove 91 provided in the switching bridge head 90, thereby blocking further movement of the movable contacting element 40 of the switching bridge 10, As a result, the movable contacting element 40 of the switching bridge 10 remains locked in this emergency stop position until it is released again from the outside, for example by pulling back or removing the arresting pins 85. In this way, unintentional reconnection of the high-voltage power supply system immediately after an emergency shutdown is reliably prevented.

Figure 3:
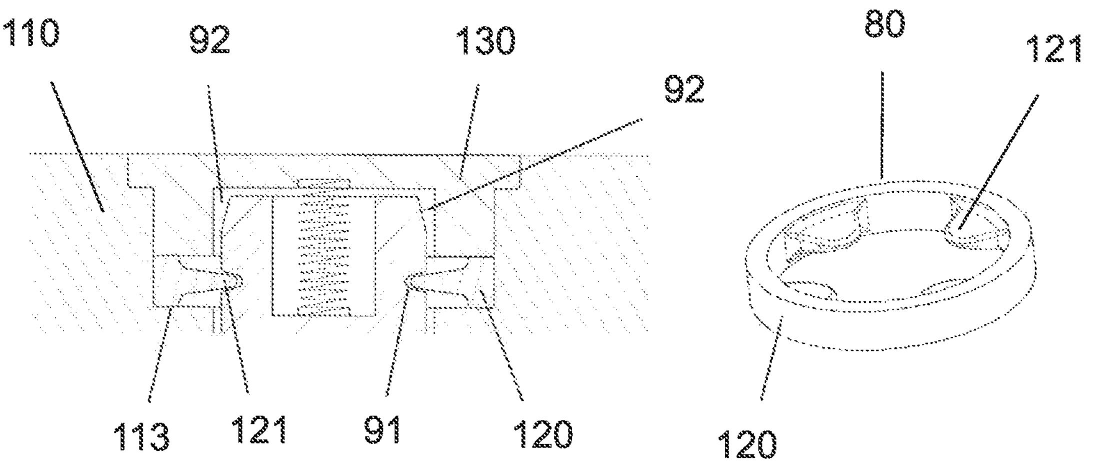
FIG. 3 shows an enlarged portion of a switching device for fast disconnection of short-circuit currents with an embodiment of an arresting device for locking a movable contacting element comprising a disc having flexible projections.

An advantageous embodiment for a permanent locking of the movable contacting element 40 of the switching bridge 10 after a pyrotechnically indexed emergency shutdown due to a short-circuit or a crash is shown in FIG. 3. According to this embodiment, the arresting device 80 is formed as an annular disc 120 having flexible projections 121, for example tongue-shaped projections, projecting into the interior of the annular disc 120. The switching bridge head 90 has a recess 91.

When compared to the embodiment of the switching device shown in FIG. 1, the bridge receptacle 110 shown in FIG. 1 has been modified in this version in such a way that the arresting pin arrangement with spring tension is replaced by the annular disc 120. The annular disc 120 comprising the flexible protuberances 121 may be constructed as a separate part, preferably in one piece from a suitable elastic plastic or also as a leaf-spring arrangement from a suitable spring steel. The annular disc 120 is positioned on the underside of the bridge receptacle 110 in such a way that is rests on a step 113 of the bridge receptacle 110 and is fixed with a sealing plug 130.

The arresting device 80 is embodied such that the flexible projections 121 slide along a surface of the switching bridge head 90 and engage in the recess 91 of the switching bridge head 90, when the switching bridge 10 is moved from the closed state to the open state as a result of the ignition of the pyrotechnic propellant charge 60.

In the event of tripping, the switching bridge head 90 is driven into the bridge receptacle 110 by the gas pressure of the pyrotechnic propellant charge 60. When the conical end face 92 of the switching bridge head 90 hits the disc 120, the inwardly directed elastic projections 121 are bent upwards in the direction of the movement of the switching bridge head 90. When the circumferential groove 91 immediately behind the conical surface 92 is reached, the ends of the flexible projections 121 bend into the groove and thus prevent the movable contacting element 40 of the switching bridge from running backwards and a high-voltage power supply system from being switched on again unintentionally.

Another advantageous embodiment for a permanent mechanical locking of the switching bridge 10 is that the flexible projection locking mechanism shown in FIG. 3 is integrated in the bridge receptacle 110. This embodiment is shown in FIG. 4.

Figure 4:
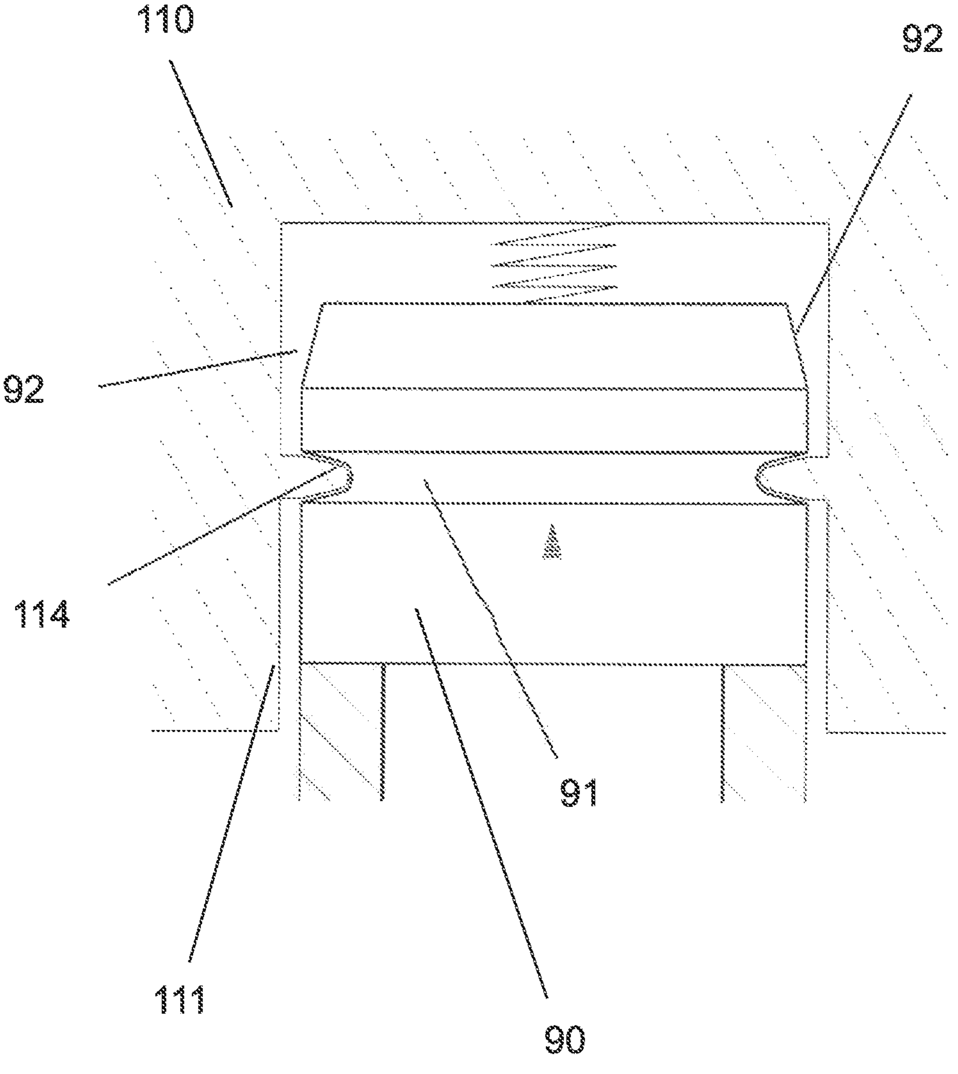
FIG. 4 shows an enlarged portion of a switching device for fast disconnection of short-circuit currents with an embodiment of an arresting device for locking a movable contacting element with flexible projections in a wall of a bridge receptacle for receiving a switching bridge head.

According to the embodiment of the switching device shown in FIG. 4, the switching device comprises the switching bridge head 90 connected to the movable contacting element 40. The switching device further comprises the bridge receptacle 110 for receiving the switching bridge head 90 and for guiding the switching bridge head 90 during the movement of the switching bridge 10. The arresting device 80 is formed as a projection 114 projecting from a wall 111 of the bridge receptacle 110. The arresting device can preferably be designed as injection-molded, inwardly directed protuberances 114 of the bridge receptacle. The switching bridge head 90 has a recess 91. The arresting device 80 is embodied such that the projections 114 slide along a surface of the switching bridge head 90 and engages in the recess 91 of the switching bridge head 90, when the switching bridge 10 is moved from the closed state to the open state as a result of the ignition of the pyrotechnic propellant charge 60.

Figure 5:
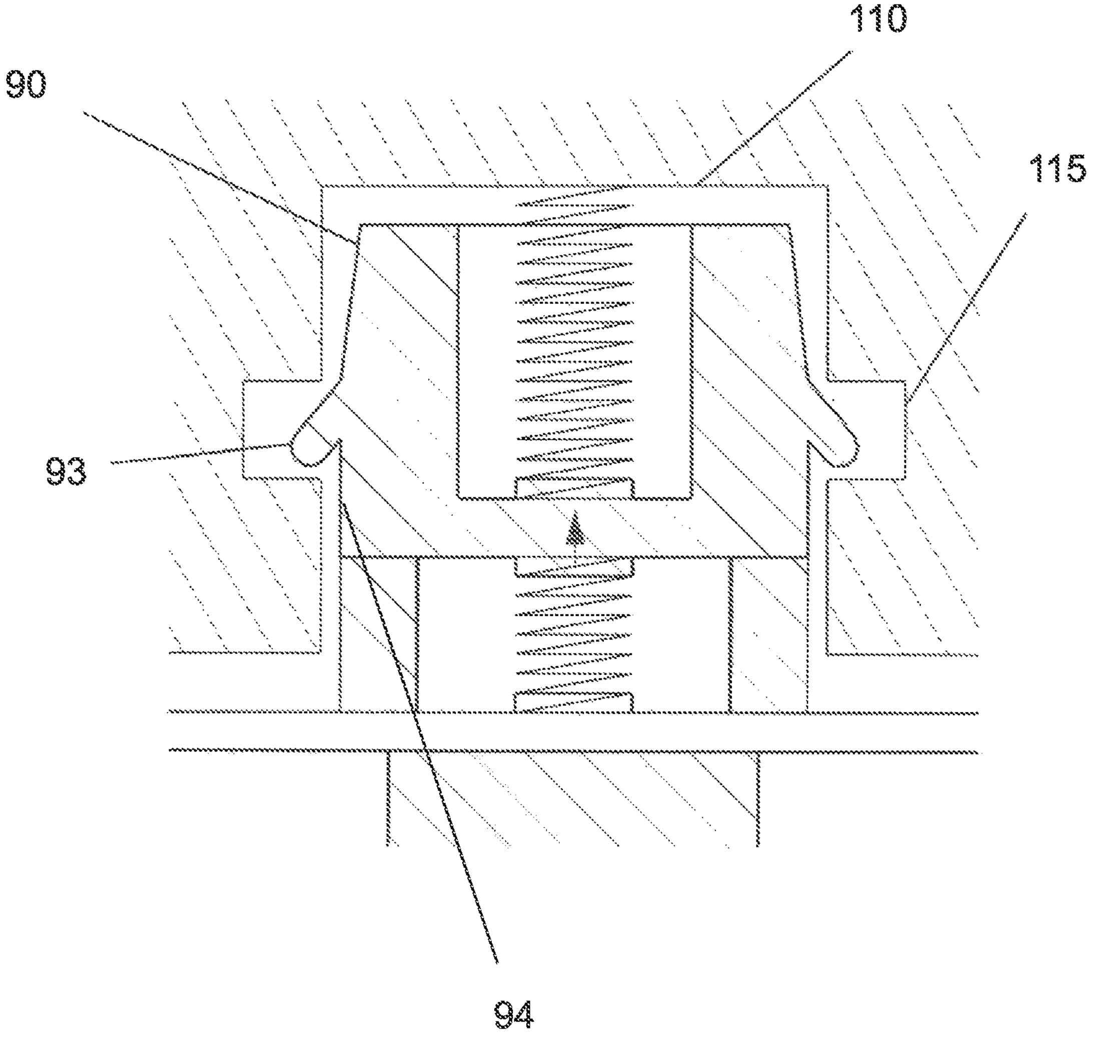
FIG. 5 shows an enlarged portion of a switching device for fast disconnection of short-circuit currents with an embodiment of an arresting device for locking a movable contacting element comprising flexible projections in a wall of a switching bridge head.

Another advantageous embodiment of the arresting device 80 is shown in FIG. 5. According to the embodiment illustrated in FIG. 5, the locking mechanism can be integrated into the switching bridge head 90 which has several flexible projections 93, for example tongue-shaped elastic protuberances, at its lower end along its circumference.

According to the embodiment shown in FIG. 5, the switching device 1 comprises the switching bridge head 90 connected to the movable contacting element 40. The switching bridgehead 90 has the flexible projection 93 projecting from a wall 94 of the switching bridge head 90. The switching device further comprises the bridge receptacle 110 for receiving the switching bridge head 90 and for guiding the switching bridge head 90 during the movement of the switching bridge 10. A wall of the bridge receptacle 110 has a cavity 115. The arresting device 80 is embodied such that the flexible projection 93 slides along the lateral wall 111 of the bridge receptacle 110 and engages in the cavity 115 of the wall 111 when the switching bridge 10 is moved from the closed state to the open state as a result of the ignition of the pyrotechnic propellant charge 60.

Figure 6:
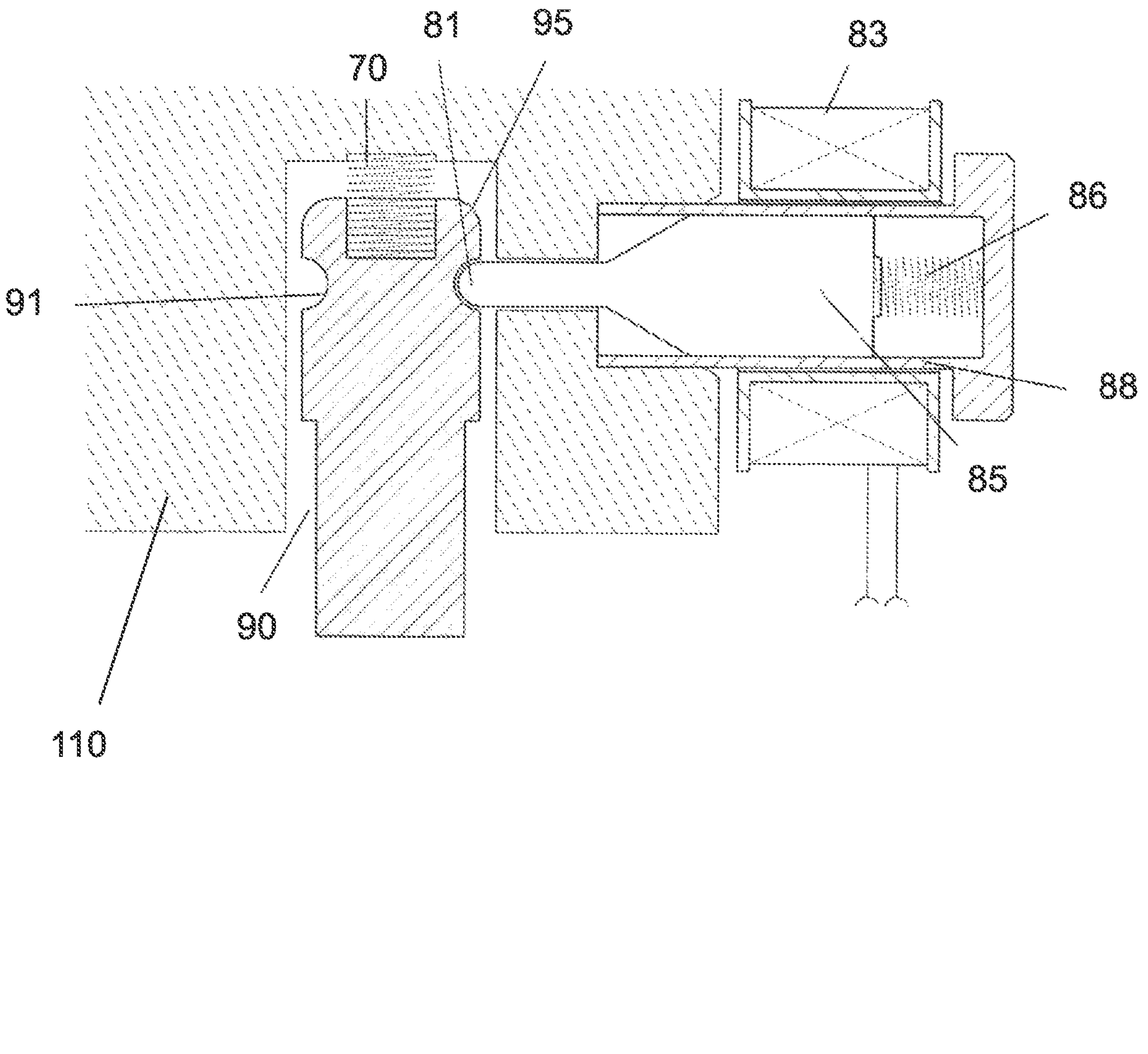
FIG. 6 illustrates an enlarged portion of a switching device for fast disconnection of short-circuit currents with an embodiment of an arresting device for locking a movable contacting element based on an electromechanical principle.

A locking of the switching bridge 10 immediately after an emergency shutdown can also be advantageously carried out electromechanically, in such a way that the locking can be intentionally released via an electrical signal and a high-voltage circuit can be closed again. An advantageous design of an electromechanical locking mechanism is shown in FIG. 6. The operating principle of this design is a targeted modification of the mechanical locking arrangement shown in FIG. 1.

As shown in FIG. 6, the arresting device 80 comprises a coil 83 surrounding the arresting pin 85. The arresting pin may be configured as a cylindrical locking pin. The arresting pin 85 comprises a front part made of a ferritic material directed in the direction of the switching bridge head 90 with a rounded tip 8L which contacts the switching bridge head 90 rounded off on the upper side when the switching bridge head 90 enters the bridge receptacle 110 and tensions the spring 86 when it moves back. When the switching bridge head 90 is pre-fast, triggered by the pyrotechnic emergency shutdown, the tip 81 of the pre-tensioned arresting pin 85 jumps into the circumferential groove 91 as it passes, thereby blocking further movement of the switching bridge 10. At the same time, the limiting spring 70 is compressed in this state.

The arresting device 80 is embodied such that a three is exerted on the arresting pin 85 by energizing the coil 83 so that the head 81 of the arresting pin 86 is pulled out of the recess 91 in the switching bridge head 90 and the locking of the movable contacting element 40 is released. In particular, the blocking of the switching bridge 10 can be released by the (annular) coil 83 which is fixed by a bolt guide 88 and in the center of which, in the locked case, the rear part of the arresting pin 85 is located. This is done by energizing the coil 83, triggered for example, by a reset signal from on-board electronics of an electric vehicle.

The ferritic tip 81 of the arresting pin located outside the center of the coil 83 is thus pulled a little into the center of the coil 83, releasing the locked switching bridge again. The movable contacting element of the switching bridge then moves in the closing direction, releasing the limiting spring 70, until the regular switched-off position of the switching bridge 10 is reached as the force equilibrium between the limiting spring and the impression spring (S) of the switching device. After that, regular switch-ort and switch-off operations of the switching device are possible again.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of “A, B and/or C” or “at least one of A, B or C” should be interpreted as including any singular entity from the listed elements, e.g., A, any subset from the listed elements, e.g., A and B, or the entire list of elements A, B and C.

LIST OF REFERENCE SIGNS

1 switching device
10 switching bridge
15 magnetic anchor
20 coil
30 guide sleeve
31 opening in guide sleeve
32 bottom surface of supporting device
33 cavity
34 wall of guide sleeve
35 supporting device
37 gap
38 outlet opening
40 movable contacting element
41 movable contact member
45 fixed contacting element
46 fixed contact member
50 contact pressure spring
60 pyrotechnic propellant charge
61 primer
65 ignition electrodes
70 compression spring
80 arresting device
81 head/tip of arresting pin
83 coil of arresting device
85 arresting pin
86 spring
88 bolt guide
90 switching bridge head
91 groove in switching bridge head
92 end portion of switching bridge head
93 flexible projection of switching bridge head
94 wall of switching bridge head
95 top portion of switching bridge head
100 magnetic switching drive
113 step in bridge receptacle
114 protuberances in bridge receptacle
115 cavity in bridge receptacle
120 disc
121 flexible projection

130 sealing plug
137 gas-permeable absorber element
140 droplet
145 arc

The invention claimed is:

1. A switching device for fast disconnection of short-circuit currents, comprising:

a switching bridge with a movable contacting element and a fixed contacting element, the switching bridge being operable in a closed state, in which the movable contacting element is in contact with the fixed contacting element, and an open state, in which the movable contacting element is spaced apart from the fixed contacting element, an electromagnetic switching drive with a coil for generating a magnetic field and a magnet anchor, wherein a movement of the magnet anchor is coupled to a movement of the switching bridge, a guide sleeve to guide the movement of the magnet anchor in the magnetic field of the coil, the magnet anchor being arranged within the guide sleeve such that a cavity is formed below the magnet anchor, a pyrotechnic propellant charge located in the cavity, and a supporting device for supporting the guide sleeve, wherein the guide sleeve and the magnet anchor and the pyrotechnic propellant charge interact such that, as a result of ignition of the pyrotechnic propellant charge within the cavity, the magnet anchor is moved from a first position within the guide sleeve at which the switching bridge is operated in the closed state to a second position within the guide sleeve at which the switching bridge is operated in the open state, wherein the supporting device and the guide sleeve are arranged such that a gap is formed between the guide sleeve and the supporting device, wherein the gap is configured to guide a gas flow of gases produced during ignition of the pyrotechnic propellant charge and emerging from the cavity into the gap.

2. The switching device of claim 1, wherein the guide sleeve has at least one opening through which gases produced during ignition of the pyrotechnic propellant charge emerge from the cavity into the gap.

3. The switching device of claim 2, wherein the at least one opening is formed as an annular hole arrangement in a wall of the guide sleeve.

4. The switching device of claim 3, wherein the movable contacting element and the fixed contacting element each comprise a contact member for electrically contacting the movable contacting element with the fixed contacting element, wherein the gap has an outlet opening for the outflow of the gases, wherein the supporting device and the guide sleeve are shaped such that the gases emerging from the outlet opening of the gap flow into a space between the contact member of the movable contacting element and the contact member of the fixed contacting element, when the pyrotechnic propellant charge is ignited.

5. The switching device of claim 2, wherein the movable contacting element and the fixed contacting element each comprise a contact member for electrically contacting the movable contacting element with the fixed contacting element, wherein the gap has an outlet opening for outflow of the gases, wherein the supporting device and the guide sleeve are shaped such that the gases emerging from the outlet opening of the gap flow into a space between the contact member of the movable contacting element and the contact member of the fixed contacting element, when the pyrotechnic propellant charge is ignited.

6. The switching device of claim 5, comprising:

a gas-permeable absorber element arranged in the gap, wherein the gas-permeable absorber element comprises a material adapted to absorb an extinguishing agent for extinguishing an electric arc.

7. The switching device of claim 6, wherein the gas-permeable absorber element is formed as a mineral fiber pad.

8. The switching device of claim 1, wherein the pyrotechnic propellant charge comprises a one-component ignitable mixture or as an initial igniter.

9. The switching device of claim 1, comprising:

an arresting device for locking the movable contacting element, wherein the arresting device is arranged such that the arresting device arrests the movable contacting element in the open state when the switching bridge has been moved into the open state as the result of the ignition of the pyrotechnic propellant charge.

10. The switching device of claim 9, comprising:

a switching bridge head connected to the movable contacting element, a bridge receptacle for receiving the switching bridge head and for guiding the switching bridge head during the movement of the switching bridge, wherein the arresting device is arranged in a bore in a wall of the bridge receptacle.

11. The switching device of claim 10, wherein the arresting device comprises an arresting pin and a spring, wherein the switching bridge head has a recess, wherein the arresting device is embodied such that the spring exerts a force on the arresting pin so that a head of the arresting pin slides along a surface of the switching bridge head and engages in the recess of the switching bridge head, when the switching bridge is moved from the closed state to the open state as the result of ignition of the pyrotechnic propellant charge.

12. The switching device of claim 11, wherein the arresting device comprises a coil surrounding the arresting pin, wherein the arresting device is embodied such that a force is exerted on the arresting pin by energizing the coil, so that the head of the arresting pin is pulled out of the recess in the switching bridge head and the locking of the movable contacting element is released.

13. The switching device of claim 10, wherein the arresting device is formed as an annular disc having flexible projections projecting into an interior of the annular disc, wherein the switching bridge head has a recess, wherein the arresting device is embodied such that the flexible projections slide along a surface of the switching bridge head and engage in the recess of the switching bridge head, when the switching bridge is moved from the closed state to the open state as the result of the ignition of the pyrotechnic propellant charge.

14. The switching device of claim 9, comprising:

a switching bridge head connected to the movable contacting element, a bridge receptacle for receiving the switching bridge head and for guiding the switching bridge head during the movement of the switching bridge, wherein the arresting device is formed as a projection projecting from a wall of the bridge receptacle, wherein the switching bridge head has a recess, wherein the arresting device is embodied such that the projection slides along a surface of the switching bridge head and engages in the recess of the switching bridge head, when the switching bridge is moved from the closed state to the open state as the result of the ignition of the pyrotechnic propellant charge.

15. The switching device of claim 9, comprising:

a switching bridge head connected to the movable contacting element, the switching bridge head having a flexible projection projecting from a wall of the switching bridge head, a bridge receptacle for receiving the switching bridge head and for guiding the switching bridge head during the movement of the switching bridge, wherein a wall of the bridge receptacle has a cavity, wherein the arresting device is embodied such that the flexible projection slides along the wall of the bridge receptacle and engages in the cavity of the wall of the bridge receptacle when the switching bridge is moved from the closed state to the open state as the result of the ignition of the pyrotechnic propellant charge.

* * * * *